US008636571B2

(12) United States Patent
Miller

(10) Patent No.: US 8,636,571 B2
(45) Date of Patent: Jan. 28, 2014

(54) SYSTEM AND METHOD FOR MANAGING SELECT FIVE HORSERACING BETS

(75) Inventor: Kenneth L. Miller, Ankeny, IA (US)

(73) Assignee: Cantor Index, LLC, New York, NY (US)

( * ) Notice: Subject to any disclaimer, the term of this patent is extended or adjusted under 35 U.S.C. 154(b) by 1570 days.

(21) Appl. No.: 10/771,221

(22) Filed: Feb. 3, 2004

(65) Prior Publication Data

US 2005/0170886 A1 Aug. 4, 2005

(51) Int. Cl.

| | |
|---|---|
| ***A63F 9/24*** | (2006.01) |
| ***A63F 13/00*** | (2006.01) |
| ***G06F 17/00*** | (2006.01) |
| ***G06F 19/00*** | (2011.01) |

(52) U.S. Cl.
USPC ........ 463/6; 463/25; 463/26; 463/27; 463/28; 463/40; 463/41; 463/42

(58) Field of Classification Search
USPC ................... 463/6, 25–28, 40–42; 700/91–93
See application file for complete search history.

(56) References Cited

U.S. PATENT DOCUMENTS 3,909,002 A * 9/1975 Levy ................................ 463/26
4,874,177 A 10/1989 Girardin
4,962,950 A 10/1990 Champion
5,275,400 A * 1/1994 Weingardt et al. .............. 463/12
5,374,060 A 12/1994 Goldberg
5,452,899 A 9/1995 Skratulia et al. .............. 273/292
5,573,244 A * 11/1996 Mindes ............................ 463/26
5,586,937 A 12/1996 Menashe
5,672,106 A 9/1997 Orford et al.
5,687,968 A 11/1997 Tarantino
5,713,793 A 2/1998 Holte
5,743,525 A 4/1998 Haddad
5,749,785 A 5/1998 Rossides
RE35,864 E 7/1998 Weingardt et al.
5,830,063 A 11/1998 Byrne
5,830,068 A * 11/1998 Brenner et al. ................. 463/42
5,839,726 A 11/1998 Luise (Continued)

FOREIGN PATENT DOCUMENTS

CA 2521159 11/2004
EP 0 217 984 A1 4/1987

(Continued)

OTHER PUBLICATIONS

PCT, Notification of Transmittal of the International Search Report and The Written Opinion of the International Searching Authority, dated Aug. 12, 2005 for International Application No. PCT/US05/03292, 10 pages.

(Continued)

*Primary Examiner* — Arthur O. Hall
*Assistant Examiner* — Wei Li

(57) ABSTRACT

A method for managing horseracing bets is provided. The method includes receiving one or more bets. Each bet comprises a selection of five horse races selected from a plurality of horse races scheduled to be run at a track in a day, a selection of a respective horse for each of the five horse races selected and a bet amount. The method also includes combining each bet amount to form a betting pool and determining an amount of a total payout for the day based at least in part on the betting pool.

20 Claims, 2 Drawing Sheets

| SELECT FIVE BET AND RESULT DATA | | | | | |
|---|---|---|---|---|---|
| RACE | BETTOR 1 | BETTOR 2 | BETTOR 3 | BETTOR 4 | RACE WINNERS |
| 1 | | HORSE #3 | HORSE #4 | | HORSE #4 |
| 2 | HORSE #2 | HORSE #2 | | | HORSE #2 |
| 3 | | HORSE #8 | HORSE #8 | | HORSE #8 |
| 4 | | HORSE #5 | HORSE #5 | HORSE #5 | HORSE #5 |
| 5 | HORSE #6 | HORSE #6 | HORSE #6 | HORSE #8 | HORSE #6 |
| 6 | | | | HORSE #7 | HORSE #6 |
| 7 | HORSE #1 | | HORSE #1 | HORSE #7 | HORSE #1 |
| 8 | HORSE #2 | | | | HORSE #2 |
| 9 | | | | | HORSE #4 |
| 10 | HORSE #3 | | | HORSE #6 | HORSE #3 |
| SELECT FIVE WINNER? | YES | NO | YES | NO | |

(56) References Cited

U.S. PATENT DOCUMENTS

| | | | | |
|---|---|---|---|---|
| 5,842,921 | A | 12/1998 | Mindes | |
| 5,888,136 | A | 3/1999 | Herbert | |
| 5,957,775 | A | 9/1999 | Cherry | |
| 5,984,779 | A | 11/1999 | Bridgeman | |
| 6,004,211 | A | 12/1999 | Brenner | |
| 6,113,492 | A | 9/2000 | Walker | |
| 6,126,543 | A | 10/2000 | Freedman | |
| 6,152,822 | A | 11/2000 | Herbert | |
| 6,210,275 | B1 * | 4/2001 | Olsen | 463/16 |
| 6,287,199 | B1 | 9/2001 | McKeown | |
| 6,296,569 | B1 | 10/2001 | Comgello | |
| 6,309,307 | B1 | 10/2001 | Krause | |
| 6,325,721 | B1 | 12/2001 | Miyamoto | |
| 6,331,148 | B1 | 12/2001 | Krause | |
| 6,354,592 | B1 | 3/2002 | Virzi | |
| 6,358,150 | B1 | 3/2002 | Mir | |
| 6,383,074 | B1 | 5/2002 | Boggs | |
| 6,450,887 | B1 | 9/2002 | Mir | |
| 6,527,270 | B2 | 3/2003 | Maksymec | |
| 6,554,708 | B1 * | 4/2003 | Brenner et al. | 463/40 |
| 6,688,978 | B1 | 2/2004 | Herman | 463/25 |
| 6,695,701 | B2 | 2/2004 | Aronson | |
| 6,712,701 | B1 * | 3/2004 | Boylan et al. | 463/42 |
| 6,722,980 | B2 * | 4/2004 | Stronach | 463/25 |
| 6,786,824 | B2 | 9/2004 | Cannon | |
| 6,811,483 | B1 | 11/2004 | Webb et al. | |
| 6,837,789 | B2 | 1/2005 | Garahi et al. | |
| 6,837,791 | B1 | 1/2005 | McNutt | |
| 6,926,607 | B2 | 8/2005 | Slomiany et al. | |
| 6,929,550 | B2 | 8/2005 | Hisad | |
| 7,147,557 | B1 | 12/2006 | Tracy et al. | |
| 7,201,658 | B2 | 4/2007 | Marshall | |
| 7,311,606 | B2 | 12/2007 | Amaitis | |
| 7,351,149 | B1 | 4/2008 | Simon et al. | |
| 2001/0031656 | A1 | 10/2001 | Marshall et al. | |
| 2001/0039209 | A1 | 11/2001 | DeWeese | |
| 2001/0041612 | A1 * | 11/2001 | Garahi et al. | 463/29 |
| 2001/0047291 | A1 | 11/2001 | Garahi et al. | |
| 2001/0051540 | A1 | 12/2001 | Hindman | |
| 2002/0049975 | A1 | 4/2002 | Thomas | |
| 2002/0094853 | A1 | 7/2002 | Hayashi | |
| 2002/0115488 | A1 | 8/2002 | Berry | |
| 2002/0149152 | A1 | 10/2002 | Taylor | |
| 2002/0177483 | A1 | 11/2002 | Cannon | |
| 2003/0054870 | A1 | 3/2003 | Sato | |
| 2003/0096646 | A1 | 5/2003 | Zhu | |
| 2003/0119582 | A1 | 6/2003 | Ocampu | |
| 2003/0125822 | A1 * | 7/2003 | LaNeve | 700/91 |
| 2003/0157976 | A1 | 8/2003 | Simon et al. | |
| 2003/0212623 | A1 | 11/2003 | Aylmer et al. | |
| 2004/0004656 | A1 | 1/2004 | Sambongi | |
| 2004/0006484 | A1 | 1/2004 | Manis | |
| 2004/0039461 | A1 | 2/2004 | Stefani | |
| 2004/0048656 | A1 | 3/2004 | Krynicky | |
| 2004/0063484 | A1 | 4/2004 | Dreaper et al. | |
| 2004/0104845 | A1 | 6/2004 | McCarthy | |
| 2004/0111358 | A1 | 6/2004 | Lange et al. | |
| 2004/0192437 | A1 * | 9/2004 | Amaitis et al. | 463/26 |
| 2004/0193469 | A1 * | 9/2004 | Amaitis et al. | 705/8 |
| 2004/0193531 | A1 | 9/2004 | Amaitis et al. | |
| 2004/0198483 | A1 | 10/2004 | Amaitis | |
| 2004/0204245 | A1 * | 10/2004 | Amaitis et al. | 463/42 |
| 2004/0229671 | A1 | 11/2004 | Stronach et al. | |
| 2004/0235542 | A1 * | 11/2004 | Stronach et al. | 463/6 |
| 2005/0032565 | A1 | 2/2005 | Cheng | |
| 2005/0044575 | A1 | 2/2005 | Der Kuyl et al. | |
| 2005/0049731 | A1 | 3/2005 | Dell | |
| 2005/0102223 | A1 | 5/2005 | Vlazny et al. | |
| 2005/0107153 | A1 | 5/2005 | Jubinville et al. | |
| 2005/0116410 | A1 | 6/2005 | Vlazny | |
| 2005/0148379 | A1 | 7/2005 | Huard | |
| 2005/0176495 | A1 | 8/2005 | Stronach | |
| 2005/0176496 | A1 | 8/2005 | Stronach | |
| 2005/0176499 | A1 | 8/2005 | Stronach | |
| 2005/0181862 | A1 * | 8/2005 | Asher et al. | 463/25 |
| 2005/0181868 | A1 | 8/2005 | Vlazny | |
| 2005/0187000 | A1 * | 8/2005 | Miller | 463/6 |
| 2006/0009281 | A1 | 1/2006 | Stronach | |
| 2006/0068874 | A1 | 3/2006 | Hornik | |
| 2006/0073870 | A1 | 4/2006 | Cannon | |
| 2006/0214376 | A1 | 9/2006 | Weller | |
| 2007/0026939 | A1 | 2/2007 | Asher et al. | |
| 2007/0026940 | A1 | 2/2007 | Cannella | |
| 2007/0184890 | A1 | 8/2007 | Ollington | |

FOREIGN PATENT DOCUMENTS

| | | | |
|---|---|---|---|
| EP | 0 625 760 | A1 | 10/1999 |
| EP | 1 104 686 | A1 | 6/2001 |
| EP | 1 288 820 | A2 | 3/2003 |
| EP | 1 319 428 | A2 | 11/2003 |
| EP | 1 442 773 | A2 | 8/2004 |
| EP | 0 848 846 | B1 | 12/2006 |
| GB | 1 574 447 | | 9/1980 |
| GB | 2 180 675 | | 4/1987 |
| GB | 2 299 425 | | 10/1996 |
| GB | 2 356 353 | | 5/2001 |
| GB | 2 377 055 | | 12/2002 |
| GB | 2 380 687 | | 4/2003 |
| GB | 2 384 097 | | 7/2003 |
| GB | 2 387 009 | | 10/2003 |
| GB | 2 388 928 | | 11/2003 |
| GB | 2 400 202 | | 10/2004 |
| JP | H10-033829 | | 7/1996 |
| JP | H9-511593 | | 11/1997 |
| JP | H10-320483 | | 12/1998 |
| JP | H11-184937 | | 7/1999 |
| JP | 2000-003405 | | 1/2000 |
| JP | 2002-215833 | | 1/2001 |
| JP | 2001-202467 | | 7/2001 |
| JP | 2002-117427 | | 4/2002 |
| JP | 2002-177630 | | 6/2002 |
| JP | 2002-542916 | | 12/2002 |
| JP | 2003-316919 | | 3/2003 |
| JP | 2003-529135 | | 9/2003 |
| JP | 2003-529142 | | 9/2003 |
| JP | 2003-530174 | | 10/2003 |
| NZ | 516935 | | 1/2002 |
| WO | WO 95/22883 | | 8/1995 |
| WO | WO 98/04991 | A1 | 2/1998 |
| WO | WO 99/01192 | A1 | 1/1999 |
| WO | WO 99/30788 | | 6/1999 |
| WO | WO 00/00256 | A1 | 1/2000 |
| WO | WO 00/22908 | A2 | 4/2000 |
| WO | WO 00/67215 | A1 | 11/2000 |
| WO | WO 00/79442 | A1 | 12/2000 |
| WO | WO01/65506 | | 9/2001 |
| WO | WO 01/65507 | A2 | 9/2001 |
| WO | WO 01/65508 | A2 | 9/2001 |
| WO | WO 01/68204 | A2 | 9/2001 |
| WO | WO 01/64305 | A2 | 10/2001 |
| WO | WO 01/73649 | A2 | 10/2001 |
| WO | WO 01/77861 | | 10/2001 |
| WO | WO 01/77861 | A2 | 10/2001 |
| WO | WO 01/77964 | A2 | 10/2001 |
| WO | WO 02/101673 | | 12/2002 |
| WO | WO 03/004115 | | 1/2003 |
| WO | WO 03/022378 | A2 | 3/2003 |
| WO | WO 03/045520 | | 6/2003 |
| WO | WO03/046852 | A2 | 6/2003 |
| WO | WO2004/003803 | A2 | 1/2004 |
| WO | WO 2005/019986 | | 3/2005 |
| WO | WO 2005/057339 | | 6/2005 |
| WO | WO 2005/074617 | | 8/2005 |
| WO | WO 2005/082478 | | 9/2005 |
| WO | WO 2005/086924 | | 9/2005 |
| WO | WO 2006/017877 | | 2/2006 |

OTHER PUBLICATIONS

Notification of Transmittal of the International Search Report and the Written Opinion of the International Searching Authority, or the Declaration, mailed Jul. 28, 2005, re International Application No. PCT/US05/06314 (10 pages).

(56) References Cited

OTHER PUBLICATIONS

Scarne, John, “Scarnes New Complete Guide to Gambling,” (excerpt); Simon & Schuster, 1974, pp. 38-42.
Scarne, John; *Scarne’s New Complete Guide to Gambling*; Simon and Schuster; pp. 32-55, 1974.
United States Patent and Trademark Office *Final Office Action* for U.S. Appl. No. 10/784,353; 15 pages, Jul. 11, 2007.
Intellectual Property Office of New Zealand *Examination Report* for Patent Application No. 549700; 3 pages, May 23, 2007.
*Internet Archive Wayback Machine*; TAB New Zealand Betting Agency; http://web.archive.org/web/19980623064154/httP//www.tab.co.nz/; 15 pages, Jun. 23, 1998.
*Examination Report* for New Zealand Patent Application No. 549121; 2 pages, May 17, 2007.
*Supplementary European Search Report* for Application No. 05712675.7-2221; 3 pages, Nov. 19, 2007.
*Internet Archive Wayback Machine*; TAB New Zealand’s Betting Agency; <http://web.archive.org/web/20031004035004/http://tab.co.nz/>; 1 page, Oct. 4, 2003.
United States Patent and Trademark Office; *Office Action* for U.S. Appl. No. 10/784,353, filed Feb. 23, 2004 in the name of Kenneth L. Miller; 7 pages, Jun. 30, 2005.
United States Patent and Trademark Office; *Office Action* for U.S. Appl. No. 10/771,076, filed Feb. 3, 2004 in the name of Joseph M. Asher; 10 pages, Jul. 14, 2005.
United States Patent and Trademark Office; *Office Action* for U.S. Appl. No. 10/784,353, filed Feb. 23, 2004 in the name of Kenneth L. Miller; 12 pages, Jan. 10, 2006.
United States Patent and Trademark Office; *Office Action* for U.S. Appl. No. 10/771,221, filed Feb. 3, 2004 in the name of Kenneth L. Miller; 12 pages, Mar. 8, 2006.
United States Patent and Trademark Office; *Office Action* for U.S. Appl. No. 10/784,353, filed Feb. 23, 2004 in the name of Kenneth L. Miller; 13 pages, Jan. 8, 2007.
United States Patent and Trademark Office; *Office Action* for U.S. Appl. No. 10/771,076, filed Feb. 3, 2004 in the name of Joseph M. Asher, 11 pages, Feb. 14, 2007.
United States Patent and Trademark Office; *Office Action* for U.S. Appl. No. 10/771,076, filed Feb. 3, 2004 in the name of Joseph M. Asher; 12 pages, Jan. 30, 2008.
Intellectual Property Office of New Zealand; *Examination Report* for Application No. 549121; 2 pages, Mar. 14, 2008.
European Patent Office; *Office Action* for Application No. 05 712 675.7-2221; 5 pages, Feb. 21, 2008.
United States Patent and Trademark Office; *Advisory Action* for U.S. Appl. No. 10/784,353, filed Feb. 23, 2004 in the name of Kenneth L. Miller; 3 pages, Apr. 19, 2006.
United States Patent and Trademark Office; *Advisory Action* for U.S. Appl. No. 10/771,076, filed Feb. 3, 2004 in the name of Joseph M. Asher; 2 pages, May 10, 2007.
United States Patent and Trademark Office; *Office Action* for U.S. Appl. No. 10/784,353, filed Feb. 23, 2004 in the name of Kenneth L. Miller; 10 pages, Mar. 11, 2008.
European Patent Office; *Office Action* for Application No. 05 723 963.4-2221; 5 pages, May 2, 2008.
Intellectual Property Office of New Zealand Examination Report for Patent Application No. 549116, Jul. 31, 2008 (2 pgs.).
Intellectual Property Office of New Zealand Examination Report for Patent Application No. 549700, Mar. 14, 2008 (2 pgs.).
USPTO Office Action for U.S. Appl. No. 10/771,076, Sep. 3, 2008 (12 pgs).
USPTO Office Action for U.S. Appl. No. 10/784,353, Sep. 5, 2008 (8 pgs).
Wonderland Greyhound Park, “Wonderland Wagering Guide,” retrieved from Internet (Aug. 29, 2008) dated Apr. 3, 2002 and Dec. 11, 2002, from Internet URL <http://web.archive.org/web/20021211160142/http://wonderlandgreyhound.com/wagering.html> (9 pgs).
“*NTRA All-Star Jockey Championship Special Wagers*”; 3 pages; date unknown.
“*Wagering Information; Straight or Basic Wagers*”; Lone Star Park at Grand Prairie: Player’s Guide; http://www.lonestarpark.com/bet_info.asp; 3 pages; date unknown.
“*Wagering Information; Straight or Basic Wagers*”; NTRA.com; http://www.ntra.com/news.asp?type=playthehorses&id=4799; 3 pages; date unknown.
“*Glossary of Terms*”; NTRA.com; http://www.ntra.com/news.asp?type=playthehorses&id=4797; 3 pages; date unknown.
“*The Basics of Horseplay*”; NTRA.com; http://www.ntra.com/news.asp ?type=playthehorses&id-4795; 2 pages; date unknown.
*Webster’s New Twentieth Century Dictionary of the English Language*; Unabridged; Second Edition; 2 pages; 1978.
New Zealand Patent Application No. 333267 entitled *Sporting Event Wagering System*; Abandoned by Applicant on Jun. 13, 2000; 2 pages; filed Dec. 9, 1998.
*Nags Head Software, Horserace*; 3 pages; circa Mar. 15, 2001.
*Bet with the People Who Know Racing*; Racing Daily Forum; 15 pages; Jul. 24, 2001.
*Betting Boolean-Style: A Framework for Trading in Securities Based on Logical Formulas*; Lance Fortnow, et al.; 12 pages; Jun. 2003.
*Quote of the Day; Bet of the Day*; London Times; 1 page; Jul. 30, 2003.
*The Patent Office Search Report* for International Application No. GB0320232.2; 6 pages; Dec. 17, 2003.
*Examination Report* for New Zealand Patent Application No. 530448; 1 page; Sep. 17, 2004.
U.S. Appl. No. 10/983,279 entitled *System and Method for Betting on a Subset of Participants in an Event* by Lee M. Amaitis, et al.; filed Nov. 5, 2004.
U.S. Appl. No. 11/076,561 entitled *System and Method for Betting on a Subset of Participants in an Event According to Multiple Groups* by Lee M. Amaitis, et al; filed Mar. 9, 2005.
*Notification of Transmittal of the International Search Report or the Declaration* for International Application No. PCT/US03/26235; 5 pages; Apr. 13, 2005.
*Report of Interview* from The Patent Office for Great Britain Application No. GB0320232.2; 3 pages; Sep. 28, 2005.
DICT.org; The DICT Development Group; “To back the field”; http://www.dict.org/bin/Dict?Form=Dict2&Database=*&Query=To+back+the=field; 6 pages; Nov. 24, 2005.
*Chilliman Chili Parlor—Appetizers; The Chili Parlor; Appetizers; A Day at the Races*; http://web.archive.org/web/20010305124432/http://chilliman.com/chiliparlor_appetizers.htm; 10 pages; Nov. 25, 2005.
*New Zealand Racing Board; Opposition to New Zealand Patent Application No. 530448 in the Name of Cantor Index LLC; Statement of Case*; 12 pages; Nov. 28, 2005.
United States Patent and Trademark Office: *Office Action* for U.S. Appl. No. 10/453,769, filed Jun. 3, 2003 in the name of Lee M. Amaitis, et al, 20 pages; Mar. 14, 2006.
*Letters Patent* for New Zealand Patent No. 530448; 1 page; Mar. 16, 2006.
*Examination Report* from The Patent Office for Great Britain Application No. GB0320232.2; 7 pages; May 11, 2006.
*Examination Report* for New Zealand Patent Application No. 539209; 2 pages; May 24, 2006.
*Examination Report* for New Zealand Patent Application No. 547179; 2 pages; May 24, 2006.
*Office Action* from The Patent Office for Great Britain Application No. GB0320232.2; 3 pages; Dec. 6, 2006.
United States Patent and Trademark Office: *Office Action* for U.S. Appl. No. 10/453,769, filed Jun. 3, 2003; in the name of Lee M. Amaitis, et al., 10 pages; Feb. 2, 2007.
United States Patent and Trademark Office: *Office Action* for U.S. Appl. No. 11/022,394, filed Dec. 22, 2004 in the name of Lee M. Amaitis, et al., 16 pages; Mar. 22, 2007.
*European Search Report* for Application No. 03816823.3-1238; 3 pages; Apr. 17, 2007.
*Notification of Transmittal of the International Search Report and the Written Opinion of the International Searching Authority, or the Declaration* for International Application No. PCT/US05/47027; 8 pages; Apr. 26, 2007.

(56) References Cited

OTHER PUBLICATIONS

United States Patent and Trademark Office, *Office Action*; for U.S. Appl. No. 10/453,769; 14 pages; Jul. 17, 2007.
United States Patent and Trademark Office; *Notice of Allowance and Fee(s) Due* for U.S. Appl. No. 11/022,394, filed Dec. 22, 2004 in the name of Lee M. Amaitis; 7 pages; Aug. 10, 2007.
Pending U.S. Appl. No. 11/928,939 entitled *System and Method for Betting on a Subset of Participants in an Event* by Lee M. Amaitis, et al.; filed Oct. 30, 2007.
Pending U.S. Appl. No. 11/928,649 entitled *System and Method for Betting on a Subset of Participants in an Event Wherein Betting Parameters May Change Over Time*; by Lee M. Amaitis, et al.; filed Oct. 30, 2007.
*European Patent Office Examination Report* for Application No. 03 816 823.3-1238; 4 pages; Nov. 19, 2007.
Anthony LeMaire; *Horse Racing Betting Odds*; http://ezinearticles.com;/?Horse-Racing-Betting-Odds&id=125666; 1 page; retrieved Jan. 4, 2008.
United States Patent and Trademark Office; *Office Action* for U.S. Appl. No. 10/453,769, filed Jun. 3, 2003 in the name of Lee M. Amaitis; 14 pages; Jan. 15, 2008.
*Notification of Transmittal of the International Search Report and the Written Opinion of the International Searching Authority* for International Application No. PCT/US06/08695; 9 pages; Mar. 24, 2008.
United States Patent and Trademark Office; *Office Action* for U.S. Appl. No. 11/076,561, filed Mar. 9, 2005 in the name of Lee M. Amaitis; 25 pages; Mar. 24, 2008.
United States Patent and Trademark Office; *Office Action* for U.S. Appl. No. 10/983,279, filed Nov. 5, 2004 in the name of Lee M. Amaitis; 17 pages; Jun. 13, 2008.
Intellectual Property Office of New Zealand; *Examination Report* for Application No. 539209; 4 pages; Jul. 31, 2008.
United States Patent and Trademark Office; *Office Action* for U.S. Appl. No. 10/453,769, filed Jun. 3, 2003 in the name of Lee M. Amaitis; 10 pages; Aug. 8, 2008.
United States Patent and Trademark Office; *Office Action* for U.S. Appl. No. 11/928,839, filed Oct. 30, 2007 in the name of Lee M. Amaitis; 7 pages; Aug. 11, 2008.
Intellectual Property Office of New Zealand; *Examination Report* for Patent Application No. 547179; 4 pages; Aug. 28, 2008.
Intellectual Property Office of New Zealand; *Examination Report* for Patent Application No. 539209; 1 page; Sep. 4, 2008.
Pending U.S. Appl. No. 10/771,076, filed Feb. 3, 2004.
Pending U.S. Appl. No. 10/784,353, filed Feb. 23, 2004.
Pending U.S. Appl. No. 10/453,769, filed Jun. 6, 2005.
Pending U.S. Appl. No. 11/022,394, filed Dec. 22, 2004.
Pending U.S. Appl. No. 11/190,613, filed Jul. 26, 2005.
United States Patent and Trademark Office; *Office Action* for U.S. Appl. No. 10/983,279, 16 pages; Dec. 24, 2008.
PCT Search report and Written Opinion for International Application No. PCT/US06/28140; 8 pages; Feb. 20, 2007.
United States Patent and Trademark Office; Office Action for U.S. Appl. No. 11/076,561; 11 pages; Dec. 22, 2008.
U.S. PTO Office Action for U.S. Appl. No. 11/190,613; filed Apr. 30, 2008.
Notice of Opposition for New Zealand Patent No. 549121; 5 pages; Dec. 23, 2008.
U.S. PTO Office Action for U.S. Appl. No. 10/453,769; 3 pages; Dec. 6, 2009.
U.S. PTO Office Action for U.S. Appl. No. 11/076,561; 29 pages; Oct. 19, 2009.
Intellectual Property Office of New Zealand Examination Report for Patent Application No. 565411, Oct. 23, 2009 (3 pgs.).
Amended Notice of Opposition for NZ Patent Application No. 549121; 4 pages; Mar. 3, 2009.
"How to Play"; accessed Mar. 24, 2009 at http://web.archive.org/web/19980623064856/www.tab.co.nz/4_how_to_play/4_f_how_to.html.
"Thoroughbred Times", accessed Mar. 24, 2009 at http://www.thoroughbredtimes.com/national-news/2004/January/15/magna-institutes-pick-five-wager.aspx.
"Majorwager.com" accessed Mar. 24, 2009 at http://www.majorwager.com/forums/race-track/139617-magna-pick-5-fails-make-500k-pool.html.
Los Angeles Times, "Magna 5 might be the Ticket", accessed Mar. 24, 2009 at http://articles.latimes.com/2004/jan/31/sports/sp-insider31.
"Magna Pick 5 Handle Tops $600,000", by Blood Horse Staff; accessed Mar. 24, 2009 at http://www.bloodhorse.com/articleindex/article.asp?id=20819.
"Your Multi Tab" Brochure, accessed Mar. 24, 2009 at http:web.archive.org/web/20031219010102/www.tab.co.nz/Multi/tab-multi-brochure.pdf.
California Regulatory Notice Register, Title 4. California Horse Racing Board, Aug. 29, 2003.
U.S. PTO Office Action for U.S. Appl. No. 11/190,613; 8 pages; Feb. 3, 2009.
European Search Report for Application No. 05712661.7; 3 pages; Aug. 11, 2009.
U.S. PTO Office Action for U.S. Appl. No. 10/784,353; 13 pages; Jun. 3, 2009.
Invendium Ltd., Online Betting Guide (OLBG) Betting School, 2202-2009, retrieved from Internet www.online-betting-guide.co.uk on May 19, 2009 from URL<http://www.online-betting-guide.co.uk/school/horse_racing_bets.php>.
U.S. PTO Office Action for U.S. Appl. No. 10/453,769; 12 pages; Aug. 4, 2009.
Beyer, Andrew, The Winning Horseplayer, 1994, 138-139.
U.S. PTO Office Action for U.S. Appl. No. 11/928,839; 14 pages; Jun. 23, 2009.
Notification of Transmittal of the International Search Report for Application No. PCT/US05/03315; 4 pages, Oct. 12, 2005.
Written Opinion of the International Searching Authority for Application No. PCT/US05/03315, 6 pages, Oct. 12, 2005.
U.S. PTO Office Action for U.S. Appl. No. 10/983,279; 16 pages; Dec. 24, 2008; 21 pages.
U.S. PTO Office Action for U.S. Appl. No. 11/076,561; 11 pages; Dec. 22, 2008.
AU Examiners Report for AU Application No. 2006276086; 4 pages; Aug. 7, 2009.
Notice of Allowance for U.S. Appl. No. 11/190,613; 29 pages; Jan. 11, 2010.
U.S. PTO Office Action for U.S. Appl. No. 10/983,279; 31 pages; Apr. 14, 2010.
New Zealand Notice of Acceptance dated Jun. 17, 2010 and Examination Report dated May 19, 2010 for NZ Application No. 572658; 3 pages.
New Zealand Examination Report for Patent Application No. 572658 dated Nov. 13, 2008; 2 pages.
AU Examiners Report for AU Application No. 2005318970; 1 page; Jun. 24, 2010.
Translation of JP Office Action for JP Application No. 2006-552226 dated Jul. 27, 2010; 4 pages.
Translation of JP Office Action for JP Application No. 2006-552223 dated Jul. 27, 2010; 4 pages.
AU Examiners Report for AU Application No. 2006220536; Sep. 29, 2010; 3 pages.
NZ Examination Report for Application No. 556076; Dec. 17, 2010 2 pages.
JP Office Action for Application No. 2007-548577 dated Jan. 4, 2011; 6 pages (includes English Translation).
Notice of Acceptance for AU Application No. 2005216980 dated Mar. 16, 2011; 3 pages.
Notice of Acceptance for AU Application No. 2006276086 dated Mar. 31, 2011; 3 pages.
NZ Examination Report for Application No. 592115; Apr. 12, 2011; 2 pages.
EP Search Report for Application No. 05855562.4 dated May 24, 2011; 7 pages.
JP Office Action for Application No. 2008-500985 dated Jun. 7, 2011; 12 pages (includes English Translation).

(56) References Cited

OTHER PUBLICATIONS

JP Office Action for Application No. 2007-548577 dated Aug. 2, 2011; 8 pages (includes English Translation).
CA Office Action for Application No. 2616157: 4 pages; Aug. 29, 2011.
NZ Examination Report for Application No. 594811; Aug. 29, 2011; 3 pages.
NZ Examination Report for Application No. 594872; 2 pages; Sep. 1, 2011.
U.S. PTO Office Action for U.S. Appl. No. 11/928,649, filed Sep. 26, 2011; 36 pages.
U.S. PTO Office Action for U.S. Appl. No. 12/776,905, filed Mar. 1, 2012; 10 pages.
EP Extended Search Report for Application No. 06800146.0; Mar. 29, 2012; 6 pages.
Notice of Acceptance for AU Application No. 2005318970; 3 pages; Mar. 27, 2012.
JP Office Action for Application No. 2008-500985 dated Apr. 24, 2012; 6 pages (includes English Translation).
European Decision to Refuse a European Patent Application for Application No. 05712675.7; Dated Sep. 17, 2012 (12 pgs).
AU Examiners Report for AU Application No. 2011203086; Mar. 21, 2012; 2 pages.
US Notice of Allowance for U.S. Appl. No. 11/928,649; Oct. 3, 2012; 5 pages.
EP Office Action for Application No. 05855562.4 dated Mar. 14, 2012, 5 pages.
NZ Examination Report, Oct. 9, 2012 for New Zealand App'l No. 602822; 2 pages.
NZ Notice of Acceptance for Application No. 592115; Oct. 9, 2012; 1 page.
CA Office Action, Jul. 5, 2012 for Canadian App'l No. 2,599,952; 4 pages.
EP Extended Search Report for Application No. 06737833.1 dated Mar. 29, 2012; 6 pages.
CA Office Action for Application No. 2521159: 2 pages; Jun. 27, 2012.
NZ Examination Report for Application No. 592189; Oct. 12, 2012 2 pages.
NZ Examination Report and Notice of Acceptance for Application No. 592189; Nov. 6, 2012 2 pages.
NZ Examination Report for Application No. 594872; 2 pages.
NZ Notice of Acceptance for Application No. 594872; 1 page.
NZ Examination Report for Application No. 607500; 2 pages.
US Notice of Allowance for U.S. Appl. No. 11/928,649; 8 pages.
CA Examiner's Report for Application No. 2,592,038; 3 pages.
NZ Notice of Acceptance for Application No. 594811; Jan. 28, 2013; 1 page.
NZ Examination Report for Application No. 605849; Jan. 18, 2013; 2 pages.
US Office Action for U.S. Appl. No. 12/776,905; Jan. 4, 2013; 6 pages.
AU Examination Report for Application No. 2011203580; Feb. 19, 2013; 3 pages.
USPTO Notice of Allowance for U.S. Appl. No. 10/983,279; Apr. 2, 2013; 12 pages.
EP Communication for EP App. No. 05855532.4; Mar. 28, 2013; 7 pages.
JP Office Action for JP App. No. 2012-158666; Jul. 9, 2013; 9 pages (w/English translation).
CA Examiner's Report for CA App. No. 2,599,952; Mar. 28, 2013; 4 pages.
EP Communication for EP App. No. 06737833.1; Jun. 4, 2013; 6 pages.
CA Examiner's Report for CA App. No. 2,521,159; Apr. 3, 2013; 2 pages.
US Office Action for U.S. Appl. No. 10/771,076; Apr. 26, 2013; 19 pages.
US Final Office Action for U.S. Appl. No. 12/776,905; Apr. 26, 2013; 10 pages.
AU Patent Examination Report for AU App. No. 2012201633; Sep. 25, 2013; 3 pages.
AU Patent Examination Report for AU App. No. 2011205156; Oct. 1, 2013; 2 pages.

* cited by examiner

100 DAY'S SELECT FIVE POOL = DAY'S SELECT FIVE BETS RECEIVED

102 DAY'S SELECT FIVE TAKE-OUT=COMMISSION RATE * DAY'S SELECT FIVE POOL

104 SELECT FIVE PAYOUT=DAY'S SELECT FIVE POOL-DAY'S SELECT FIVE TAKE-OUT+ SELECT FIVE CARRYOVER

| SELECT FIVE BET AND RESULT DATA | | | | | |
|---|---|---|---|---|---|
| RACE | BETTOR 1 | BETTOR 2 | BETTOR 3 | BETTOR 4 | RACE WINNERS |
| 1 | | HORSE #3 | HORSE #4 | | HORSE #4 |
| 2 | HORSE #2 | HORSE #2 | | | HORSE #2 |
| 3 | | HORSE #8 | HORSE #8 | | HORSE #8 |
| 4 | | HORSE #5 | HORSE #5 | HORSE #5 | HORSE #5 |
| 5 | HORSE #6 | HORSE #6 | HORSE #6 | HORSE #8 | HORSE #6 |
| 6 | | | | HORSE #7 | HORSE #6 |
| 7 | HORSE #1 | | HORSE #1 | HORSE #7 | HORSE #1 |
| 8 | HORSE #2 | | | | HORSE #2 |
| 9 | | | | | HORSE #4 |
| 10 | HORSE #3 | | | HORSE #6 | HORSE #3 |
| SELECT FIVE WINNER? | YES | NO | YES | NO | |

SYSTEM AND METHOD FOR MANAGING SELECT FIVE HORSERACING BETS

TECHNICAL FIELD OF THE INVENTION

This invention relates in general to wagering and, more particularly, to wagering on horse races.

BACKGROUND OF THE INVENTION

Wagering on horse races is a large and growing industry in many parts of the world. Various types of horse race bets are available at horseracing tracks. For example, many tracks provide one or more "Daily Double" bets in which a bettor may bet on the winners of two consecutive races chosen by the track (e.g., the first two or last two races of the day). Some tracks also provide a "Pick Three," where bettors select the winners of three consecutive races chosen by the track, a "Pick Four," where bettors select the winners of four consecutive races chosen by the track, and/or a "Pick Six," where bettors select the winners of six consecutive races chosen by the track.

SUMMARY OF THE INVENTION

According to one embodiment, a method for managing horseracing bets is provided. The method includes receiving one or more bets. Each bet comprises a selection of five horse races selected from a plurality of horse races scheduled to be run at a track in a day, a selection of a respective horse for each of the five horse races selected and a bet amount. The method also includes combining each bet amount to form a betting pool and determining an amount of a total payout for the day based at least in part on the betting pool.

The method may include receiving results of the plurality of horse races scheduled to be run. The results may identify a winning horse for each of the plurality of horse races scheduled to be run. The method may also include determining one or more winning bets of the one or more bets based on the results. Determining one or more winning bets may comprise determining for each of the one or more bets if each selected respective horse corresponds to the winning horse for each of the five horse races selected in the bet. The method may also include determining an amount to be paid for each winning bet based on the number of winning bets, the amount of the total payout and the bet amount of each winning bet. Determining an amount of a total payout based at least in part on the betting pool may comprise applying a commission rate to the betting pool. Determining an amount of a total payout based at least in part on the betting pool may also comprise adding to the betting pool a carryover amount from a previous racing day. The method may also include determining whether there are any winning bets by determining for each of the one or more bets if each selected respective horse corresponds to the winning horse for each of the five horse races selected in the bet and determining a carryover amount to carry over to a total payout of a future racing day if there are no winning bets.

According to another embodiment, a system for managing horseracing bets is provided. The system includes a memory operable to store one or more bets. Each bet comprises a selection of five horse races selected from a plurality of horse races scheduled to be run at a track in a day, a selection of a respective horse for each of the five horse races selected and a bet amount. The system also includes a processor coupled to the memory. The processor is operable to combine each bet amount to form a betting pool and determine an amount of a total payout for the day based at least in part on the betting pool.

The processor may be further operable to receive results of the plurality of horse races scheduled to be run. The results may identify a winning horse for each of the plurality of horse races scheduled to be run. The processor may also be operable to determine one or more winning bets of the one or more bets based on the results. A processor operable to determine one or more winning bets may comprise a processor operable to determine for each of the one or more bets if each selected respective horse corresponds to the winning horse for each of the five horse races selected in the bet. The processor may be further operable to determine an amount to be paid for each winning bet based on the number of winning bets, the amount of the total payout and the bet amount of each winning bet. The processor may be further operable to cancel at least one of the plurality of horse races scheduled to be run at the track in the day and receive results of the plurality of horse races scheduled to be run, wherein the results identify a winning horse for at least one of the plurality of horse races scheduled to be run. The processor may also be operable to determine one or more winning bets by determining for each of the one or more bets if at least one of the selected respective horses corresponds to the winning horse for at least one of the five horse races selected in the bet.

Various embodiments of the present invention may benefit from numerous advantages. It should be noted that one or more embodiments may benefit from some, none, or all of the advantages discussed below.

One advantage of the invention is that bettors are given the opportunity to select five races out of those scheduled to be run at a track in a day and to bet on each such race, with all such bets going to a pool for distribution to winners of such bets. Thus, a bettor may select the five races in a day that the bettor feels he has the best chance to correctly pick the winners. Moreover, if a bettor misses one of his five selected races early in the day, the bettor can re-enter the pool by selecting five additional races that have not yet run. Other advantages will be readily apparent to one having ordinary skill in the art from the following figures, descriptions, and claims.

BRIEF DESCRIPTION OF THE DRAWINGS

For a more complete understanding of the present invention and for further features and advantages, reference is now made to the following description, taken in conjunction with the accompanying drawings, in which.

DETAILED DESCRIPTION OF EXAMPLE EMBODIMENTS OF THE INVENTION

Figures 1, 3:
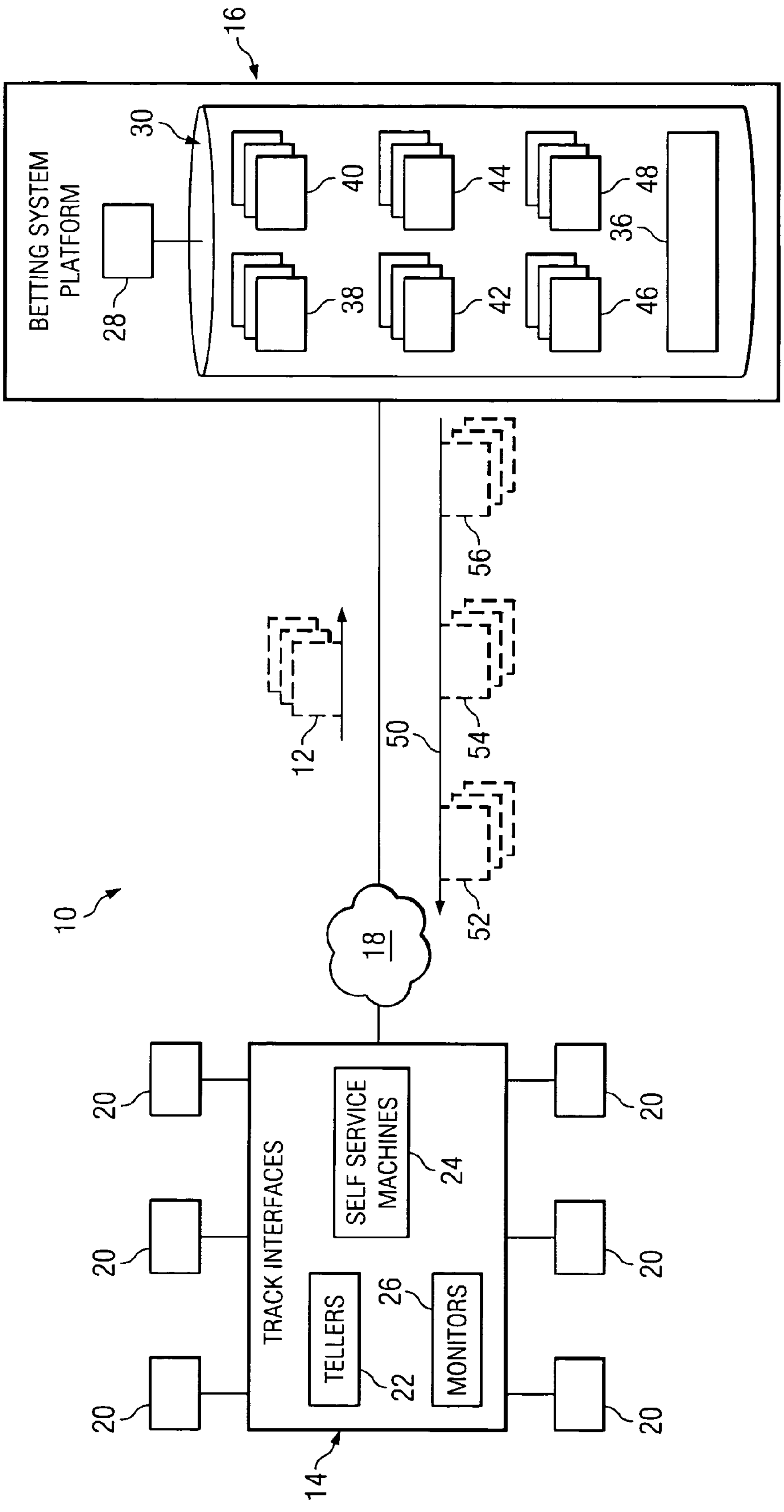
FIG. 1 illustrates a system for receiving and managing Select Five bets, in accordance with an embodiment of the present invention.
FIG. 3 illustrates various equations for calculating potential Select Five bet payouts, in accordance with an embodiment of the present invention.

FIG. 1 illustrates an example system 10 for receiving and managing bets 12 in accordance with an embodiment of the present invention. System 10 includes track interfaces 14 and a betting system platform 16 coupled by a communications network 18. In general, one or more bettors 20 may receive betting information (such as race times, betting rules, betting options and odds, for example) and/or place bets 12 via track interfaces 14. Track interfaces 14 communicate such bets 12 received from bettors 20 to betting system platform 16. Betting system platform 16 stores the received bets 12, determines appropriate odds and payouts and communicates such odds and payouts to track interfaces 14.

In a given day, a horseracing track may be scheduled to run any number of races. Various types of races may be held the same day, such as races of various lengths and races for horses of various types and/or ages. On most race days, the track will be scheduled to hold more than five races. System 10 permits bettors 20 to select five races out of those scheduled for a particular day and to bet on the winners of the five races selected. Such a bet may be referred to as a "Select Five" bet, and bets 12 may be referred to herein as Select Five bets 12. The five races selected may be consecutive or nonconsecutive races. Different bettors 20 may choose different races to constitute their selected five races of their respective Select Five bets. For example, if nine races are scheduled to be run on a particular day, one bettor 20 may select Race 1, Race 2, Race 4, Race 5 and Race 8, while another bettor 20 may select Race 5, Race 6, Race 7, Race 8 and Race 9. Each such bettor 20 will also select a winner for each race chosen. A winning Select Five bet may constitute one that correctly selects the winning horse of each of the five races selected by the bettor in the bettor's Select Five bet. It is possible that a track may have multiple Select Five bet winners in a particular day, and those winners may have selected different races on which to bet in their respective Select Five bets.

System 10 is preferably a pari-mutuel betting system in which all Select Five bets 12 received in a day are pooled, a commission (or "take-out") is taken by the track or other wagering provider, and the remainder constitutes the Select Five payout and is distributed among all winning Select Five bettors.

Track interfaces 14 may include any suitable track interface between a bettor 20 and betting system platform 16, such as tellers 22 and self-service betting machines 24, which may receive bets 12 from and distribute payouts to bettors 20. Track interfaces 14 may also include monitors 26, which may be viewed by bettors 20 to monitor betting information such as race times, schedule, current odds and projected or actual payouts for Select Five bets 12, for example. In some situations, such information may be updated substantially in real time or at preset intervals (such as every 30 seconds, for example) as new Select Five bets 12 are placed and/or as information regarding the races changes, for example.

A bettor may place a Select Five bet 12 at a track interface 14 on a day up until the point when there are fewer than five races remaining. For example, if there are 11 races scheduled for a particular day, a Select Five bet may be placed at anytime before betting has closed for Race 7. Note that in this example if a bettor waits until after Race 6 to place a Select Five bet, then the bettor must select the winners of Races 7, 8, 9, 10 and 11 in the bettor's Select Five bet. This enables bettors who may have selected earlier races in the day in a Select Five bet and missed selecting the winning horses of any of those races to place one or more additional Select Five bets encompassing five of the remaining races to be run in the day. Thus, such bettors still have a chance to win the Select Five payout for the day.

As discussed above, betting system platform 16 is operable to receive Select Five bets 12 from track interfaces 14, store the received bets 12, determine appropriate payouts and communicate such payouts to the track interfaces 14, which may then display such payouts to bettors 20. As shown in FIG. 1, betting system platform 16 includes a processor 28 coupled to a memory 30. Processor 28 is generally operable to execute various algorithms or calculations to determine current Select Five pool data 52, current odds data 54, current or potential Select Five payout data 56, and any other suitable information.

As discussed above, betting system platform 16 comprises processor 28 and memory 30. Processor 28 may comprise any suitable processor, such as a central processing unit (CPU) or other microprocessor, that executes a betting system software application 36 or other computer instructions and may include any suitable number of processors working together. Memory 30 may comprise one or more memory devices suitable to facilitate execution of the computer instructions, such as one or more random access memories (RAMs), read-only memories (ROMs), dynamic random access memories (DRAMs), fast cycle RAMs (FCRAMs), static RAM (SRAMs), field-programmable gate arrays (FPGAs), erasable programmable read-only memories (EPROMs), electrically erasable programmable read-only memories (EE-PROMs), microcontrollers or microprocessors.

Memory 30 is generally operable to store various information that may be used by processor 28 in determining odds and/or payouts. For example, memory 30 may comprise any suitable number of databases, which may be co-located or physically and/or geographically distributed. In the example shown in FIG. 1, memory 30 may store any or all of the following: betting system software application 36, current odds data 38, race parameters 40, Select Five bet parameters 42, Select Five calculation rules 44, race results 46 and Select Five bet results 48.

Race parameters 40 may comprise various parameters of one or more races, such as, for example, the type of race, the time of the race and/or the number (or in some cases, the name) of each of the horse in the race. Select Five bet parameters 42 may comprise various parameters of one or more received Select Five bets 12, such as the identity of the bettor 20 who placed the Select Five bet 12, the commission rate on the Select Five bet 12, the races covered by the Select Five bet 12, the horses covered by the Select Five bet 12 and/or the amount of the Select Five bet 12, for example. Select Five calculation rules 44 may comprise various equations or other algorithms to be used by processor 28 in determining various current Select Five pool data 52, current odds data 54 and current or potential Select Five payout data 56. Race results 46 may comprise various data regarding the results of one or more races, such as the winner of each race in a given day, for example. Select Five bet results 48 may comprise various data regarding the results of various Select Five bets 12, such as the identity of the bettor 20 who placed the Select Five bet 12, whether the Select Five bet 12 was a winning bet, the determined payout for the Select Five bet 12 and/or whether the payout was distributed to the bettor 20, for example. It should be understood that particular components stored in memory 30 may be combined or separated in any suitable manner in memory 30 according to particular needs. As an example, FIG. 2 further discussed below illustrates an example of Select Five Bet and Result Data, which may combine data from Select Five bet parameters 42, race results 46 and Select Five bet results 48.

As discussed above, one or more communications networks 18 couple and facilitate wireless and/or wireline communication between track interfaces 14 and betting system platform 16. Each communication network 18 may include one or more servers, routers, switches, repeaters, backbones, links and/or any other appropriate type of communication devices coupled by links such as wire line, optical, wireless or other appropriate links. In general, each communication network 18 may include any interconnection found on any communication network, such as a local area network (LAN).

As discussed above, processor 28 is operable to execute betting system software application 36 to determine current Select Five pool data 52, current odds data 54 and current or potential Select Five payout data 56. Processor 28 may determine such pool, odds or payout data based at least on data received from memory 30 and/or track interfaces 14. In addition, processor 28 may update such pool, odds or payout data based on new information being received by betting system platform 16. In some embodiments, processor 28 may update such data in real time, substantially in real time, or at preset intervals (such as every 30 seconds, for example).

As illustrated in FIG. 1, current Select Five pool data 52, current odds data 54 and current or potential Select Five payout data 56 may be communicated to track interfaces 14 via communications network 18, as indicated by arrow 50. Such data may then be made available to bettors 20, such as via monitors 32.

Figures 2, 4:
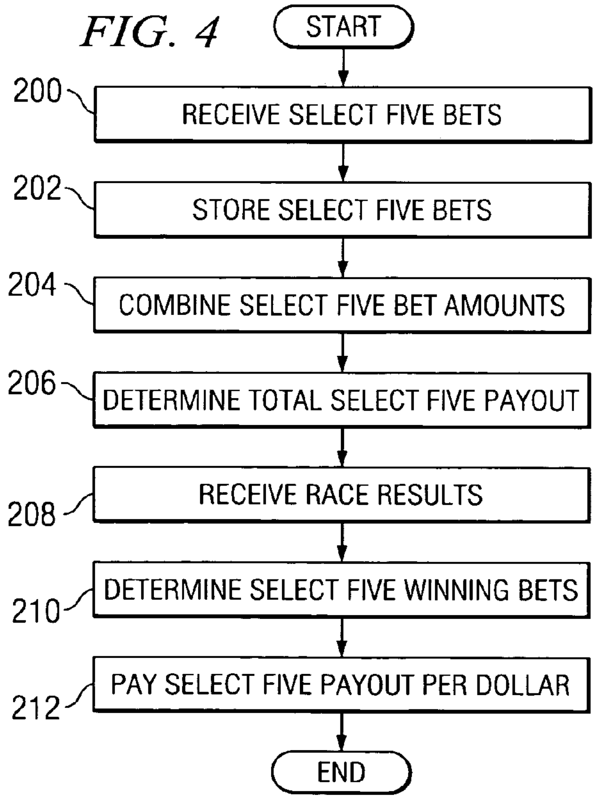
FIG. 2 illustrates example Select Five bet and result data which may be determined by a betting system platform and communicated to bettors, in accordance with an embodiment of the present invention.
FIG. 4 is a flowchart illustrating an example method of receiving, managing and paying Select Five bets, in accordance with an embodiment of the present invention.

FIG. 2 illustrates example Select Five bet and result data for a particular day at a track. It should be understood that while a bettor may select more than one horse per race (e.g., at an incremental cost), the illustrated example assumes the bettors selected only one horse per race. In the example, the track is scheduled to run ten races, and Bettors 1-4 each make Select Five bets. Bettor 1 selects to bet on Races 2, 5, 7, 8 and 10; Bettor 2 selects to bet on Races 1, 2, 3, 4 and 5; Bettor 3 selects to bet on Races 1, 3, 4, 5 and 7; and Bettor 4 selects to bet on Races 4, 5, 6, 7 and 10. Bettor 1 selects Horse #2 to win Race 2, Horse #6 to win Race 5, Horse #1 to win Race 7, Horse #2 to win Race 8 and Horse #3 to win Race 10. Bettor 2 selects Horse #3 to win Race 1, Horse #2 to win Race 2, Horse #8 to win Race 3, Horse #5 to win Race 4 and Horse #6 to win Race 5. Bettor 3 selects Horse #4 to win Race 1, Horse #8 to win Race 3, Horse #5 to win Race 4, Horse #6 to win Race 5 and Horse #1 to win Race 7. Bettor 4 selects Horse #5 to win Race 4, Horse #8 to win Race 5, Horse #7 to win Race 6, Horse #7 to win Race 7 and Horse #6 to win Race 10. In the example, Horse #4 wins Race 1, Horse #2 wins Race 2, Horse #8 wins Race 3, Horse #5 wins Race 4, Horse #6 wins Race 5, Horse #6 wins Race 6, Horse #1 wins Race 7, Horse #2 wins Race 8, Horse #4 wins Race 9 and Horse #3 wins Race 10.

Comparing the races and horses selected to the actual race winners, one can see that Bettors 1 and 3 accurately selected the winners of each race they respectively selected in their Select Five bets. Bettor 2 accurately selected the winners of four out of five selected races (correctly selected the winners of Races 2, 3, 4 and 5 but missed the winner of Race 1). Bettor 4 accurately selected the winner of one out of five selected races (correctly selected the winner of Race 4 but missed Races 5, 6, 7 and 10). Thus, Bettors 1 and 3 would each receive a portion of the total Select Five payout for that particular day at the track. If Bettors 1 and 3 were the only Select Five winners for that day, then they would divide the total Select Five payout for the day, for example on a per dollar wagered basis.

It is possible that in a particular day a track may not have any Select Five bets that correctly select the winners of five respectively selected races. In those cases, the track may pay some or all of the Select Five payout for that day to Select Five bettors who correctly select the most of their five races (e.g., some or all of the Select Five payout may be split among bettors correctly selecting four out of their five respectively selected races). In some cases, the track may pay no Select Five bettors for a particular day if no bettor correctly picks the winners of all five of the bettor's selected races.

It should be understood that in the event that any payout is made to a plurality of Select Five bettors picking the same number of races correctly, the payout will be divided among such Select Five bettors according to dollars wagered by each such bettor. For example, if two Select Five bettors correctly select the winners of all five races respectively selected and one such bettor wagered $1 for his winning Select Five bet while the other Select Five bettor wagered $2 for his winning Select Five bet, then the Select Five bettor that wagered $2 will receive twice the amount of the Select Five payout received by the bettor that wagered $1.

Any portion of the Select Five payout for a particular day not paid by the track that day (e.g., if there are no Select Five bets that correctly pick the winners of five selected races and the full Select Five payout for the day is not distributed to bettors correctly picking less than five selected races) may carry over to a future racing day, such as the next racing day, to be combined with the Select Five bets placed on such future racing day to constitute the future racing day's Select Five payout. Such a carryover may occur multiple days if some or all of multiple days' Select Five payouts are not paid on such days. It should be understood that in the event that no Select Five bettors in a particular day correctly select the winners of five selected races and the track still pays a portion of that day's Select Five payout (e.g., to those correctly selecting four winners out of five selected races), then in some cases such portion may not include any Select Five amounts carried over from previous racing days. This would ensure that any carryover Select Five amounts would only be paid to those bettors who correctly select the winning horses in all five of their respectively selected races.

It is possible that on some race days, a number of scheduled races may be cancelled or suspended or may otherwise constitute a "no contest" race such that no winner is determined. In this case, Select Five bets may still exist that may not have missed a selected race previously run. For example, bad weather may force the cancellation of scheduled Races 7, 8, 9 and 10 on a particular day. Certain Select Five bettors may already have correctly selected the winning horses in five previously run selected races (e.g., five races out of Races 1-6). Moreover, other Select Five bettors may have Select Five bets that are "still alive" in that they have not yet missed selecting a winner of any of their five selected races. In these situations, a track may distribute some or all of that day's Select Five payout according to any suitable formula, algorithm or method. As an example, the track may distribute a Select Five payout for a particular day (either including or excluding carryover Select Five amounts from previous race days) to bets that are "still alive" (i.e., bets that have not yet missed a winner of a selected race) according to the following formula (predicated on a ten-race card):

Cancel after Race 1: Entire pool split among bets that are still alive

Cancel after Race 2: 66⅔% to bets with 2 wins, 33⅓% to bets with 1 win

Cancel after Race 3: 50% to bets with 3 wins, 33⅓% to bets with 2 wins, 16⅔% to bets with 1 win Cancel after Race 4: 40% to bets with 4 wins, 30% to bets with 3 wins, 20% to bets with 2 wins, 10% to bets with 1 win Cancel after Race 5: 75% to bets with 5 wins; and the remaining 25% divided as follows:

40% to bets with 4 wins, 30% to bets with 3 wins, 20% to bets with 2 wins, 10% to bets with 1 win Cancel after Race 6: 75% to bets with 5 wins; and the remaining 25% divided as follows:

40% to bets with 4 wins, 30% to bets with 3 wins, 20% to bets with 2 wins, 10% to bets with 1 win Cancel after Race 7: 75% to bets with 5 wins; and the remaining 25% divided as follows:

50% to bets with 4 wins, 33⅓% to bets with 3 wins, 16⅔% to bets with 2 wins

Cancel after Race 8: 75% to bets with 5 wins; and the remaining 25% divided as follows:

66⅔% to bets with 4 wins, 33⅓% to bets with 3 wins

Cancel after Race 9: 75% to bets with 5 wins, 25% to bets with 4 wins

In the above example, if there are no Select Five bets still alive for a particular category, then that category's amount may be added to another category's amount. For example, if after Race 7 there are no Select Five bets still alive with 3 wins, then the amount for the 3 win category (e.g., 33⅓% of the remaining 25%) may be added to the 4 win category (such that the 4 win category constitutes 83⅓% of the remaining 25% in the example). Any amounts not paid out according to the above formula may carry over to a Select Five payout of a future racing day. It should be understood that the above formula is merely given as an example, and a track may or may not distribute some or all of a Select Five payout in the event of cancelled, suspended or "no contest" races according to any suitable formula, algorithm or method. Moreover, some tracks may choose not to pay any portion of a Select Five payout in the event of any cancelled or "no contest" races and may carryover such payout to a future racing day.

As discussed above, processor 28 may calculate various current or potential Select Five payout data 56 using various algorithms or equations. FIG. 3 illustrates examples of such algorithms or equations in accordance with one embodiment of the present invention. In particular, FIG. 3 illustrates various equations for calculating the current potential payout for a Select Five bet 12 in a particular day.

In particular, FIG. 3 illustrates equation 100 which indicates that a particular day's Select Five bets received constitutes the day's Select Five pool. Equation 102 shows that a day's Select Five take-out is calculated by multiplying a certain commission (e.g., 15%) by the day's Select Five pool. In equation 104, the Select Five payout is determined by subtracting the day's Select Five take-out from the day's Select Five pool and adding any Select Five carryover from previous race days. As discussed above, some days may include a carryover from one or more previous race days while other days may include no carryover in the Select Five payout.

FIG. 4 is a flowchart illustrating an example method of receiving, managing and paying Select Five bets 12, in accordance with an embodiment of the present invention. At step 200, Select Five bets 12 are received from one or more bettors 20 via one or more track interfaces 14, such as described above with reference to FIG. 1. Each Select Five bet 12 received includes a selection of five horse races selected from a plurality of horse races scheduled to be run at the track in the day, a selection of a respective horse for each of the five horse races selected and a bet amount. Each Select Five bet 12 may be stored at step 202, such as within memory 30, for example.

At step 204, the Select Five bet amounts may be combined to form the day's Select Five betting pool. At step 206, a total Select Five payout for the day is determined. Such determination may include deducting a commission from the Select Five betting pool, such as by applying a commission rate to the pool. The determination of the Select Five payout may also include adding a Select Five carryover amount from a previous racing day.

At step 208 the results of the day's races are received. Such results include an identification of a winning horse for each race run during the day. At step 210, Select Five winning bets are determined from the Select Five bets 12 received and stored at steps 200 and 202, respectively. In some cases, a Select Five bet 12 may be considered a winning bet only if the Select Five bet 12 includes a correct selection of winning horses for each race selected in the bet. In other cases, a Select Five bet 12 may be entitled to some winning amount if the bet 12 includes a correct selection of a winning horse for at least one of the races selected in the bet, particularly if no Select Five bets 12 received include a correct selection of winning horses for each race respectively selected. At step 212, a Select Five payout per dollar may be paid to bettors 20 with winning Select Five bets 12. In some cases, a certain amount of the Select Five payout for the day may carry over to a future racing day if no Select Five bets 12 received include a correct selection of winning horses for each race respectively selected.

Some of the steps illustrated in FIG. 4 may be combined, modified or deleted where appropriate, and additional steps may also be added to the flowchart. Additionally, steps may be performed in any suitable order without departing from the scope of the invention.

As discussed above, various embodiments of invention provide a number of advantages. One advantage is that a bettor may select the five races in a day that the bettor feels he has the best chance to correctly pick the winners. Such selected races may include the most favored horses in the day. If a bettor misses one of his five selected races early in the day, the bettor can re-enter the pool by selecting five additional races that have not yet run. In some cases, bettors may win their five selected races before all the races are complete for the day, thus giving the bettor an incentive to stay at the track longer to collect the bettor's Select Five winnings (since the final payout will not be determined until there are no more Select Five bets with a chance at winning). Staying at the track longer may mean that the bettor places additional bets at the track thus increasing track profit. Bettors may watch the Select Five pool grow throughout the day thus giving a greater incentive to place a Select Five bet in the event of a large Select Five pool.

Although the present invention has been described in detail with reference to particular embodiments, it should be understood that various other changes, substitutions and alterations may be made hereto without departing from the spirit and scope of the present invention. It is intended that the present invention encompass all changes, substitutions, variations, alterations and modifications ascertained by those skilled in the art as falling within the spirit and scope of the appended claims.

What is claimed is:

1. A method for managing horseracing bets, comprising:

receiving at a computer betting system a plurality of bets each from a respective bettor, each bet comprising:

a selection of five horse races selected by the bet's respective bettor from a plurality of horse races scheduled to be run at a track in a day;

a selection of a respective horse for each of the five horse races selected; and a bet amount;

wherein at least one selected horse race of a first bet of the plurality of bets comprises a different horse race from at least one selected horse race of a second bet of the plurality of bets;

combining each bet amount to form a betting pool; and computing at the computer betting system an amount of a total payout for the day based at least in part on the betting pool.

2. The method of claim 1, further comprising:

receiving results of the plurality of horse races scheduled to be run, the results identifying a winning horse for each of the plurality of horse races scheduled to be run; and determining one or more winning bets of the plurality of bets based on the results.

3. The method of claim 2, wherein determining one or more winning bets comprises determining for each of the plurality of bets if each selected respective horse corresponds to the winning horse for each of the five horse races selected in the bet.

4. The method of claim 2, further comprising determining an amount to be paid for each winning bet based on the number of winning bets and the amount of the total payout.

5. The method of claim 4, wherein determining an amount to be paid for each winning bet is further based on the bet amount of each winning bet.

6. The method of claim 1, wherein computing an amount of a total payout based at least in part on the betting pool comprises applying a commission rate to the betting pool.

7. The method of claim 1, wherein determining an amount of a total payout based at least in part on the betting pool comprises adding to the betting pool a carryover amount from a previous racing day.

8. The method of claim 1, further comprising:

receiving results of the plurality of horse races scheduled to be run, the results identifying a winning horse for each of the plurality of horse races scheduled to be run;

determining whether there are any winning bets by determining for each of the plurality of bets if each selected respective horse corresponds to the winning horse for each of the five horse races selected in the bet; and determining a carryover amount to carry over to a total payout of a future racing day if there are no winning bets.

9. The method of claim 1, further comprising:

canceling at least one of the plurality of horse races scheduled to be run at the track in the day;

receiving results of the plurality of horse races scheduled to be run, the results identifying a winning horse for at least one of the plurality of horse races scheduled to be run; and determining one or more winning bets by determining for each of the plurality of bets if at least one of the selected respective horses corresponds to the winning horse for at least one of the five horse races selected in the bet.

10. A system for managing horseracing bets, comprising:

a memory operable to store a plurality of bets each received from a respective bettor, each bet comprising:

a selection of five horse races selected by the bet's respective bettor from a plurality of horse races scheduled to be run at a track in a day;

a selection of a respective horse for each of the five horse races selected; and a bet amount;

wherein at least one selected horse race of a first bet of the plurality of bets comprises a different horse race from at least one selected horse race of a second bet of the plurality of bets; and a processor coupled to the memory, the processor operable to:

combine each bet amount to form a betting pool; and determine an amount of a total payout for the day based at least in part on the betting pool.

11. The system of claim 10, wherein the processor is further operable to:

receive results of the plurality of horse races scheduled to be run, the results identifying a winning horse for each of the plurality of horse races scheduled to be run; and determine one or more winning bets of the plurality of bets based on the results.

12. The system of claim 11, wherein a processor operable to determine one or more winning bets comprises a processor operable to determine for each of the plurality of bets if each selected respective horse corresponds to the winning horse for each of the five horse races selected in the bet.

13. The system of claim 11, wherein the processor is further operable to determine an amount to be paid for each winning bet based on the number of winning bets and the amount of the total payout.

14. The system of claim 13, wherein the processor is operable to determine an amount to be paid for each winning bet further based on the bet amount of each winning bet.

15. The system of claim 10, wherein a processor operable to determine an amount of a total payout based at least in part on the betting pool comprises a processor operable to apply a commission rate to the betting pool.

16. The system of claim 10, wherein a processor operable to determine an amount of a total payout based at least in part on the betting pool comprises a processor operable to add to the betting pool a carryover amount from a previous racing day.

17. The system of claim 10, wherein the processor is further operable to:

receive results of the plurality of horse races scheduled to be run, the results identifying a winning horse for each of the plurality of horse races scheduled to be run;

determine whether there are any winning bets by determining for each of the plurality of bets if each selected respective horse corresponds to the winning horse for each of the five horse races selected in the bet; and determine a carryover amount to carry over to a total payout of a future racing day if there are no winning bets.

18. The system of claim 10, wherein the processor is further operable to:

cancel at least one of the plurality of horse races scheduled to be run at the track in the day;

receive results of the plurality of horse races scheduled to be run, the results identifying a winning horse for at least one of the plurality of horse races scheduled to be run; and determine one or more winning bets by determining for each of the plurality of bets if at least one of the selected respective horses corresponds to the winning horse for at least one of the five horse races selected in the bet.

19. A method for managing horseracing bets, comprising:

receiving at a computer betting system a plurality of bets each from a respective bettor, each bet comprising:

a selection of five horse races selected by the bet's respective bettor from a plurality of horse races scheduled to be run at a track in a day;

a selection of a respective horse for each of the five horse races selected; and a bet amount;

wherein at least one selected horse race of a first bet of the plurality of bets comprises a different horse race from at least one selected horse race of a second bet of the plurality of bets;

combining each bet amount to form a betting pool;

computing at the computer betting system an amount of a total payout for the day based at least in part on the betting pool;

receiving results of the plurality of horse races scheduled to be run, the results identifying a winning horse for each of the plurality of horse races scheduled to be run;

computing at the computer betting system one or more winning bets of the plurality of bets by determining for each of the plurality of bets if each selected respective horse corresponds to the winning horse for each of the five horse races selected in the bet; and computing at the computer betting system an amount to be paid for each winning bet based on the number of winning bets, the amount of the total payout and the bet amount of each winning bet.

20. The method of claim 19, wherein computing an amount of a total payout based at least in part on the betting pool comprises:

applying a commission rate to the betting pool; and adding to the betting pool a carryover amount from a previous racing day.

* * * * *